United States Patent
Gokturk et al.

(10) Patent No.: US 6,538,402 B2
(45) Date of Patent: Mar. 25, 2003

(54) SELF-OSCILLATION SYSTEM FOR DRIVING A LINEAR OSCILLATORY ACTUATOR AROUND ITS RESONANT FREQUENCY

(75) Inventors: Halit S. Gokturk, Mountain View, CA (US); Satoshi Nakayama, Hirakata (JP); Kozo Kawai, Neyagawa (JP); Hideaki Abe, Neyagawa (JP); Toyokatsu Okamoto, Hikone (JP)

(73) Assignee: Matsushita Electric Works, Ltd., Osaka (JP)

( * ) Notice: Subject to any disclaimer, the term of this patent is extended or adjusted under 35 U.S.C. 154(b) by 0 days.

(21) Appl. No.: 09/758,237

(22) Filed: Jan. 12, 2001

(65) Prior Publication Data

US 2001/0008355 A1 Jul. 19, 2001

(30) Foreign Application Priority Data

Jan. 14, 2000 (JP) ........................ 2000-007117

(51) Int. Cl.[7] ............................................ H02K 33/04
(52) U.S. Cl. ..................... 318/128; 318/127; 318/126
(58) Field of Search ................ 318/119, 126, 318/127, 128

(56) References Cited

U.S. PATENT DOCUMENTS

| 5,202,612 A | 4/1993 | Yoshida et al. ............. 318/138 |
| 5,632,087 A | 5/1997 | Motohashi et al. .......... 30/43.92 |
| 5,866,998 A | 2/1999 | Menegoli ..................... 318/254 |
| 6,133,701 A | 10/2000 | Gokturk et al. ............. 318/114 |

FOREIGN PATENT DOCUMENTS

| EP | 0 952 663 A2 | * 10/1999 |
| JP | 63314191 | 12/1988 |

* cited by examiner

Primary Examiner—Nestor Ramirez
Assistant Examiner—Judson H. Jones
(74) Attorney, Agent, or Firm—Rader, Fishman & Grauer PLLC

(57) ABSTRACT

An improved self-oscillation system for a linear oscillatory actuator composed of a stator and a reciprocator. The stator carries a winding to which an electric current is periodically supplied for making a resonant oscillation of the reciprocator. The system includes a self-oscillation circuit for continuing the resonant oscillation of the actuator by a positive feedback manner based upon a back electromotive force (Vbemf) appearing across the winding. The system further includes a PWM control for increasing the electric current in response to a decreasing oscillation amplitude due to an increasing load applied to the reciprocator. A detector circuit is included to monitor the oscillation amplitude of the reciprocator and provides a corresponding detector output in response to which the self-oscillation circuit provides a drive pulse of varying pulse width for making the PWM control. The detector circuit is connected to monitor Vbemf of the winding in the absence of the electric current and to judge the instant oscillation amplitude of the reciprocator based upon the monitored Vbemf. Thus, the system can eliminate an external sensor, yet assuring the PMW control reliably based upon Vbemf correctly reflecting the actual oscillation of the reciprocator.

7 Claims, 5 Drawing Sheets

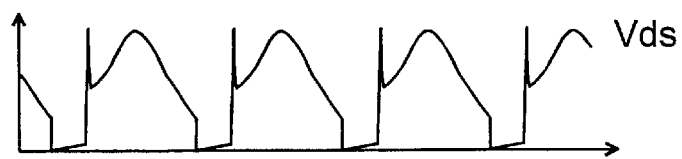
FIG. 3A — Vds
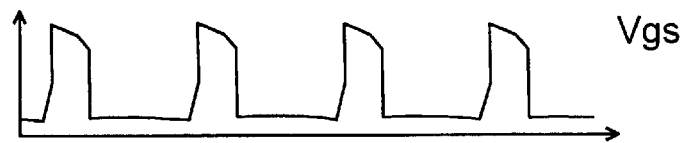
FIG. 3B — Vgs
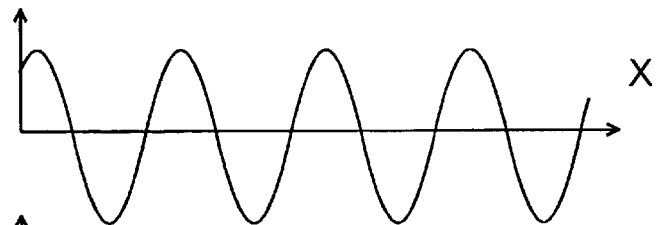
FIG. 3C — X
FIG. 3D — Id
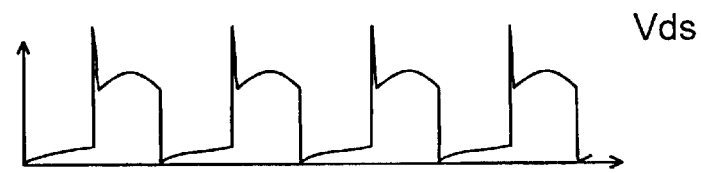
FIG. 4A — Vds
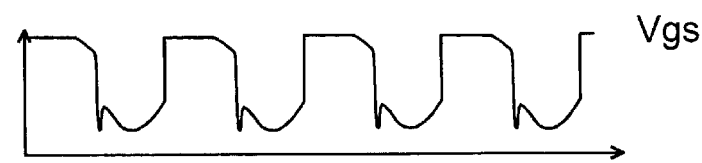
FIG. 4B — Vgs
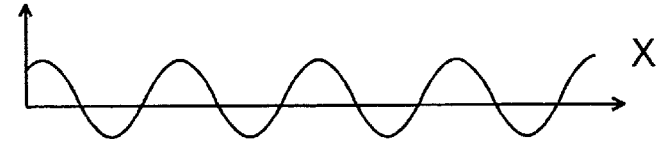
FIG. 4C — X
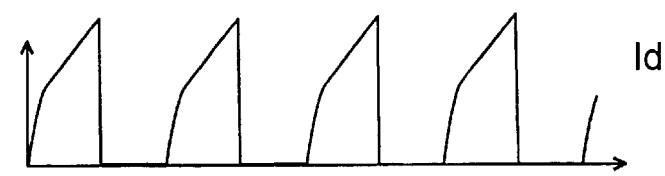
FIG. 4D — Id

SELF-OSCILLATION SYSTEM FOR DRIVING A LINEAR OSCILLATORY ACTUATOR AROUND ITS RESONANT FREQUENCY

BACKGROUND OF THE INVENTION

1. Field of the Invention

The present invention relates to a self-oscillation system for driving a linear oscillatory actuator at its resonant frequency, and more particularly to the system added with a controller for keeping a consistent oscillation even under a varying load condition.

2. Description of the Prior Art

A linear oscillatory actuator has been utilized in many electrical devices such as a reciprocatory shaver, and normally comprises a stator carrying a winding and a reciprocator carrying a permanent magnet. The winding is connected to receive a periodical electric current from a power source to generate a magnetic flux which interacts with the permanent magnet to cause a mechanical resonance of the reciprocator, thereby forcing the reciprocator to move linearly relative to the stator.

U.S. Pat. No. 6,133,701 discloses a system for driving the linear oscillatory actuator with a use of a self-oscillation circuit. The circuit is connected to receive a back electromotive force developed across the winding in a positive feedback manner to generate a drive pulse by which the electric current is periodically supplied to the winding for continuing the mechanical resonance of the reciprocator. With this scheme, however, the reciprocator is difficult to keep the consistent oscillation without being considerably damped when subjected to a heavy load. In order to alleviate this problem, a PWM controller could be added to the circuit for varying a pulse width of the drive pulse in accordance with an instant oscillation amplitude of the reciprocator, as disclosed in U.S. Pat. No. 5,632,087. The patent discloses the use of an external sensor disposed in juxtaposition of the reciprocator for detection of the instant oscillation amplitude of the reciprocator. In addition to increasing the number of discrete components, the external sensor requires a complex and cumbersome design of turning the sensor output to the PWM controller for precise PWM control based upon the true oscillation amplitude of the reciprocator. This is particularly true when adding the PWM control to the self-oscillation circuit giving the drive pulse in the positive feedback of the back electromotive force.

SUMMARY OF THE INVENTION

The present invention has been accomplished in view of the above problem to provide an improved self-oscillation system for driving a linear oscillatory actuator around its resonant frequency. The linear oscillatory actuator includes a reciprocator which moves linearly relative to a stator around its natural mechanical resonance frequency. One of the stator and the reciprocator carries a winding, while the other of the stator and the reciprocator carries a permanent magnet. The winding is connected to receive a periodical electric current to develop a magnetic flux which interacts with the permanent magnet to continue driving the reciprocator around its natural frequency. The system of the present invention includes a self-oscillation circuit which is connected to receive a back electromotive force (Vbemf) appearing across the winding in a positive feedback manner to generate a drive pulse by which the electric current is periodically supplied to the winding for continuing the oscillation of the reciprocator. In order to regulate the electric current in match with a load applied to the reciprocator, the system includes a detector circuit which monitors an instant oscillation amplitude of the reciprocator and provides a detector output indicative of the instant oscillation amplitude. Also, a controller is included to give a control signal indicative of the detector output to the self-oscillation circuit so that the self-oscillation circuit modulates the drive pulse in accordance with the control signal to regulate an electric power being supplied to the winding, thereby compensating for a variation in the load being applied to the reciprocator so as to continue the resonant oscillation of the reciprocator. The characterizing feature of the present invention resides in that the detector circuit is connected to monitor Vbemf of the winding in the absence of the electric current and to judge the instant oscillation amplitude of the reciprocator based upon the monitored Vbemf. Accordingly, the system of the present invention can best utilize Vbemf of the winding for accurate detection of the instant oscillation amplitude of the reciprocator without requiring an external sensor, and therefore assure a reliable feedback control of keeping the consistent oscillation amplitude around a constant level, i.e., without considerably damping the resonance oscillation under a varying load condition, which is therefore a primary object of the present invention.

In a preferred version of the present invention, the self-oscillation circuit comprises a voltage amplifier providing the drive pulse of a variable pulse width, and a switch connected tin series with the winding across the power source to flow the electric current periodically from the power source through the winding. The voltage amplifier is connected to receive Vbemf through a positive feedback path from the linear actuator to provide the drive pulse which is applied through the switch to periodically flow the electric current through the winding for continued oscillation of the reciprocator. The switch allows the electric current to be self-regulated to vary in a reverse proportion to Vbemf, thereby forming a self-current compensator which compensates for an amplitude of reciprocator reduction resulting from the increasing load. The voltage amplifier also receives the control signal form the controller to act as a pulse-width modulator which varies the pulse width of the drive pulse by the control signal in a direction of increasing the pulse width with the decreasing Vbemf detected at the detector circuit. The switch responds to the drive pulse to flow the electric current over a period of the drive pulse width in compensation for a variation in Vbemf indicative of the load applied to the reciprocator for continued resonant oscillation of the reciprocator. In this manner, the PMW control can be active in synergy with the self-current compensator to compensate for the varying load over a wide range.

The power source is preferably a DC power source which supplies the DC electric current to the winding through the switch, and the detector circuit can be designed to judge the oscillation amplitude based upon the peak voltage of Vbemf.

In another preferred version of the present invention, the self-oscillation circuit comprises a voltage amplifier providing a reference signal of a frequency synchronized with the oscillation of reciprocator, an AND circuit having one input receiving the reference signal and the other input receiving the control signal from the controller, and a switch connected in series with the winding across the power source to flow the electric current from the power source through the winding. The controller comprises a sawtooth generator which issues a sawtooth signal having a frequency synchronized with the oscillation of the reciprocator, and a comparator which compares the sawtooth signal with the detector output indicative of the instant oscillation amplitude of the reciprocator in order to provide the control signal in the form of a rectangular pulse of which width varies in reverse proportion to Vbemf detected at the detector circuit and therefore in direction proportion to the load being applied to the reciprocator. The AND circuit acts as a pulse width modulator to modulate the reference signal by the control signal so as to provide the drive pulse of which pulse width varies in direct proportion to the load. The switch responds to the drive pulse to flow the electric current periodically over a period of the drive pulse width in compensation for a variation in Vbemf indicative of the load applied to the reciprocator for continued resonant oscillation of the reciprocator. Also in this instance, the switch allows the electric current to be-self-regulated to vary in a reverse proportion to Vbemf, thereby forming a self-current compensator which compensates for an amplitude of reciprocator reduction resulting from the increased load. Thus, the PMW control is made available in synergy with the self-current compensator to compensate for the wide range load variation. Further, since the sawtooth signal is derived from the reference signal reflecting Vbemf responsible for generating the drive pulse, the resulting control signal can be accurately tuned to the drive pulse, enabling to make a reliable PWM control for keeping the oscillation amplitude of the reciprocator around a constant level. In this connection, the sawtooth generator includes a rectangular wave generator which receives the reference signal from the voltage amplifier and reshapes it into a rectangular ware signal, and an integrator which integrates the rectangular wave signal to provide the sawtooth signal of which frequency is synchronized with the oscillation of the reciprocator.

Further, the detector circuit comprises a differential amplifier providing an output voltage indicative of a difference between Vbemf and a reference voltage, and a peak voltage detector which determines a peak voltage of the output voltage as the detector output which is indicative of the oscillation amplitude of the reciprocator, and is compared with the sawtooth signal at the comparator to provide the rectangular control signal. Thus, Vbemf well indicative of the instant oscillation amplitude of the reciprocator can be suitably processed to provide the control signal which compensates for the load variation that the reciprocator experiences during its oscillation.

These and still other objects and advantageous features of the present invention will become more apparent from the following description of the preferred embodiments when taken in conjunction with the attached drawings.

BRIEF DESCRIPTION OF THE DRAWINGS

FIGS. 3A to 3D are waveform charts illustration a PWM control in accordance with Vbemf while the actuator oscillates under no load condition;

FIGS. 4A to 4D are waveform charts illustration the PWM control in accordance with Vbemf while the actuator oscillates under a loaded condition;

DETAILED DESCRIPTION OF THE PREFERRED EMBODIMENTS

Figure 1:
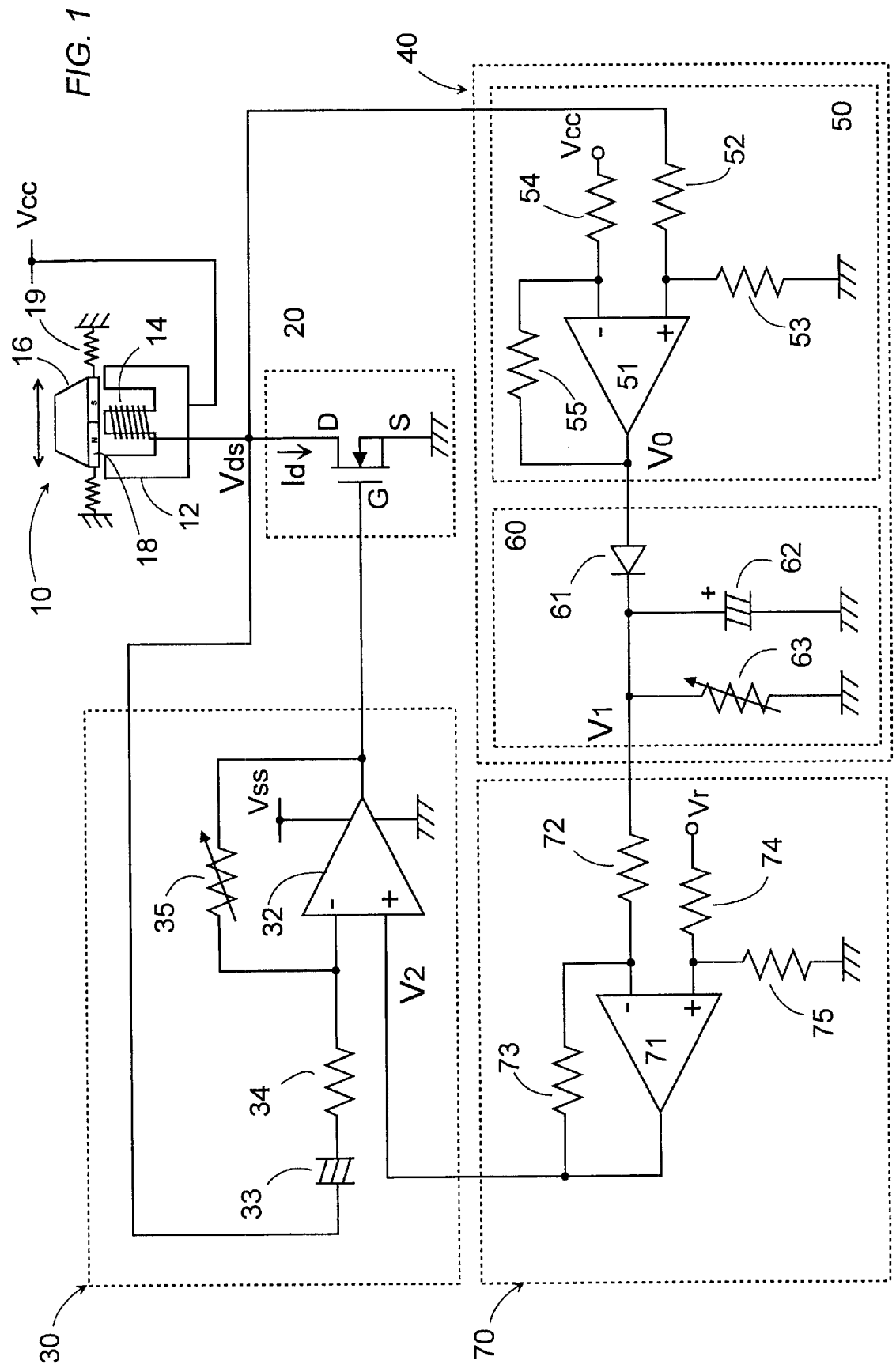
FIG. 1 is a circuit diagram of a self-oscillation system for driving a linear oscillatory actuator in accordance with a first preferred embodiment of the present invention.

Referring now to FIG. 1, there is shown a self-oscillatory system for driving a linear oscillatory actuator in accordance with a first embodiment of the present invention. The linear oscillatory actuator 10 comprises a stator 12 carrying a coil 14, and a reciprocator 16 carrying a pair of oppositely magnetized permanent magnets 18. The coil 14 is energized by a DC current supplied from a DC power source Vcc to generate a magnetic field which interacts with the permanent magnets, forcing the reciprocator 16 to move relative to the stator in a linear path The reciprocator 16 is suspended by a pair of springs 19 which urge the reciprocator towards a neutral or center position and is cooperative with a mass of the reciprocator to give a natural free oscillation frequency so that the reciprocator oscillates in resonance upon receiving a periodical driving force from the winding 14. A semiconductor switch 20 is connected in series with the winding 14 and is driven to turn on and off periodically to supply the DC current Id intermittently to the winding 14. The switch 20 is realized by a metal oxide semiconductor field effect transistor (MOSFET) having a drain, a gate, and a source. The linear actuator is utilized, for example, in a dry shaver to drive an inner cutter thereof. In this particular use where the inner cutter suffers from a varying load mainly due to a shearing resistance experienced during the shaving, the actuator is required to compensate for the varying load in order to continue the shaving successfully with sufficient shearing force or enough oscillation amplitude given to the actuator. To this end, the present incorporates a PWM control for continuing the resonant oscillation of the reciprocator with a sufficient oscillation amplitude even under a loaded condition, as will be discussed later.

The system includes a self-oscillation circuit composed of a voltage amplifier 30 and the switch 20. The voltage amplifier 30 issues a drive pulse Vgs to the gate of the switch 20 for periodically supplying the DC current Id through the winding 14 in a positive feedback manner based upon a back electromotive force (Vbemf) developed across the winding 14 during the oscillation of the reciprocator 16. Vbemf is acknowledged as equivalent to a drain-source voltage Vds of the switch 20. The voltage amplifier 30 includes an operational amplifier 32 having an inverting input connected to receive the Vds, i.e., Vbemf through a capacitor 33 and a resistor 34, and having a non-inverting input connected to receive a control signal $V_2$ for making the pulse-width modulation (PWM) control, details of which will be explained hereinafter. A variable resistor 35 is connected between the output and the inverting input of the operational amplifier 32 to be cooperative with resistor 34 to adjust an amplification factor of the amplifier as well as to adjust the phase of the electric current to the phase of Vbemf for maximum efficiency. Starting of the linear actuator 10 is made by a transient pulse which is generated upon energization of the self-oscillation circuit and is fed to the switch 20 for supplying an initial current to the winding 16, after which the voltage amplifier 30 operates in the positive feedback manner to supply the electric current Id periodically for continuing the resonant oscillation of the reciprocator 16.

The PWM control is realized in the system to monitor an instant oscillation amplitude X of the reciprocator 16 for keeping the oscillation amplitude around a constant level irrespective of a varying load condition in which the reciprocator suffers from the load which would otherwise damp the oscillation considerably. For this purpose, the system includes a detector circuit 40 composed of a differential amplifying circuit 50 for monitoring Vbemf, i.e., Vds, and a peak voltage detector 60 which obtains a peak voltage $V_1$ indicative of the oscillation amplitude X of the reciprocator 16. The differential amplifying circuit 50 includes an operational amplifier 51 having a non-inverting input connected to receive the drain-source voltage Vds of the switch 20 through resistor 52 and also connected to the ground through a resistor 53 so that Vds divided by resistance of resistors 52 and 53 is applied to the non-inverting input of the amplifier 51. An inverting input of the amplifier 51 is connected to receive the DC source voltage Vcc through a resistor 54. A resistor 55 is connected across the inverting input and the output of the amplifier 51. Resistors 52 and 54 are set to have the same resistance $R_1$, while resistors 53 and 55 are set to have the same resistance $R_2$ so that the amplifier 51 gives the output voltage $V_0$ which is expressed by the following equation, $$V_0=(R_1/R_2)\times(Vds-Vcc)$$

Figure 2A:
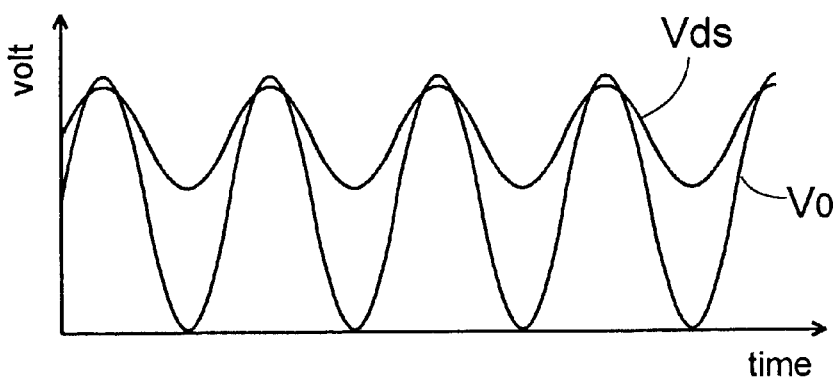
FIGS. 2A, 2B, and 2C are waveform charts illustrating the determination of a peak voltage $V_1$ for a back electromotive force (Vbemf) developed at the linear oscillatory actuator.

Because of that, in the absence of the electric current Id, Vds is defined as Vds=Vcc+Vbemf and is therefore in direct proportion to Vbemf, and that Vbemf varies in direct proportion to the oscillation amplitude X of the reciprocator 16, the output voltage $V_0$ can certainly reflect the oscillation amplitude X. FIG. 2A shows a waveform of $V_0$ when Vds of a sinusoidal waveform is applied to the amplifier 51 for easy understanding of the relation between $V_0$ and Vds, although the exact Vds appearing in the present system is more complex than the sinusoidal waveform, as is seen in FIGS. 3A and 4A presented for illustration of the PWM control of the present system.

Figure 2B:
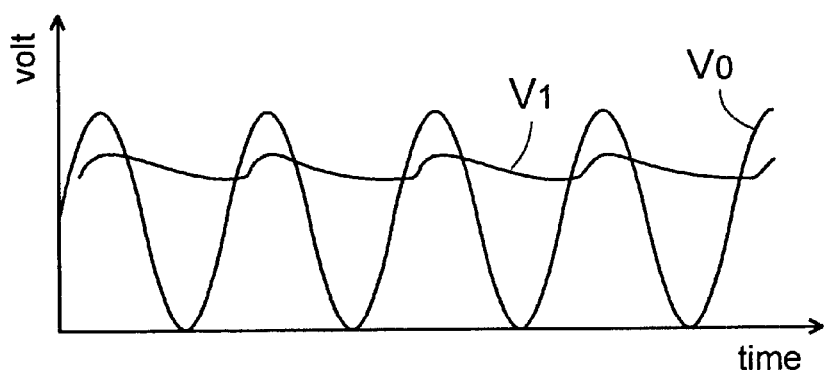
Figure 2C:
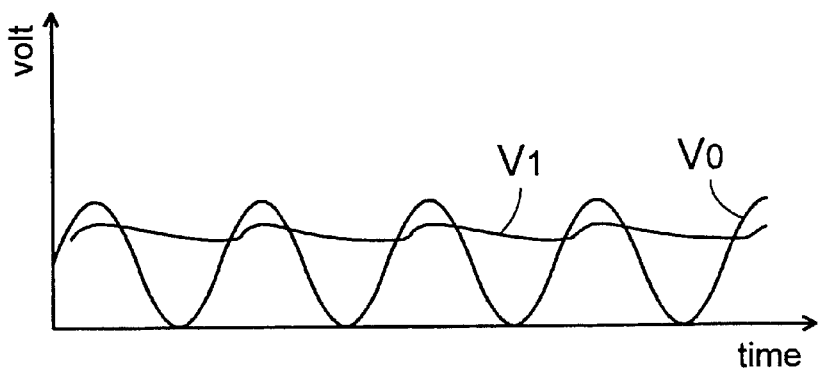

The peak voltage detector 60 comprises a capacitor 62 connected to receive the output voltage $V_0$ through a diode 61, and a variable resistor 63 connected across the capacitor 62. The resistor 63 is cooperative with capacitor 62 and is set to a suitable resistance in such a manner as to provide a detector output voltage $V_1$ which represents a maximum or peak voltage of $V_0$ from the differential amplifying circuit 50. That is, the detector output $V_1$ varies with varying peak voltage of $V_0$, as shown in FIGS. 2B and 2C illustrated for a simplified case in which the detector circuit receives the Vds of sinusoidal waveform. Thus, the peak voltage $V_1$ is well indicative of the oscillation amplitude X of the reciprocator 16.

The detector output $V_1$ is then processed at a control circuit 70 to provide the control signal $V_2$ which is fed to the voltage amplifier 30 for the PWM control of varying the pulse width of the drive pulse Vgs applied to the switch 20 in a direction of increasing the electric current Id as the oscillation amplitude X is lowered due to the increasing load applied to the reciprocator 16, thereby continuing the resonant oscillation of the reciprocator without being considerably damped, i.e., keeping the oscillation amplitude around the constant level. The control circuit 70 comprises an operational amplifier 71 having an inverting input which is connected to receive $V_1$ from the peak voltage detector 60 through a resistor 72, and having a non-inverting input connected to a fixed voltage source Vr and the ground respectively through resistors 74 and 75. A resistor 73 is connected between the inverting input and output of the operational amplifier 71. Resistors 72 and 74 are set to have the equal resistance R3, while resistors 73 and 75 set to have the equal resistance R4, so that the operational amplifier 71 gives the control output $V_2$ which is expressed by the following equation:

$$V_2=(R3/R4)\times(Vr-V1)$$

Thus, the control signal $V_2$ increases with the decreasing detector output $V_1$ reflecting the decreased oscillation amplitude X due to the increasing load applied to the reciprocator 16. The control voltage $V_2$ gives a bias or offset voltage to the operational amplifier 32 so as to increase the pulse width of the drive pulse Vgs and therefore increase the drain current Id as the control voltage $V_2$ decreases, and vice versa. FIGS. 3A to 3D illustrate waveforms of the drain-source voltage Vds as indicative of Vbemf, the drive pulse Vgs, the oscillation amplitude X, and the drain current Id when the reciprocator is running under no load condition, while FIGS. 4A to 4D illustrate the wave forms of the same when the reciprocator is running under a loaded condition. Thus, the drive pulse Vgs from the voltage amplifier 30 is modulated by the control signal $V_2$ to compensate for the varying load being applied to the reciprocator 16, thereby enabling to continue the resonant oscillation without considerably fluctuating the oscillation amplitude of the reciprocator 16. In this sense, the voltage amplifier 30 also acts as the PWM controller.

Figure 5:
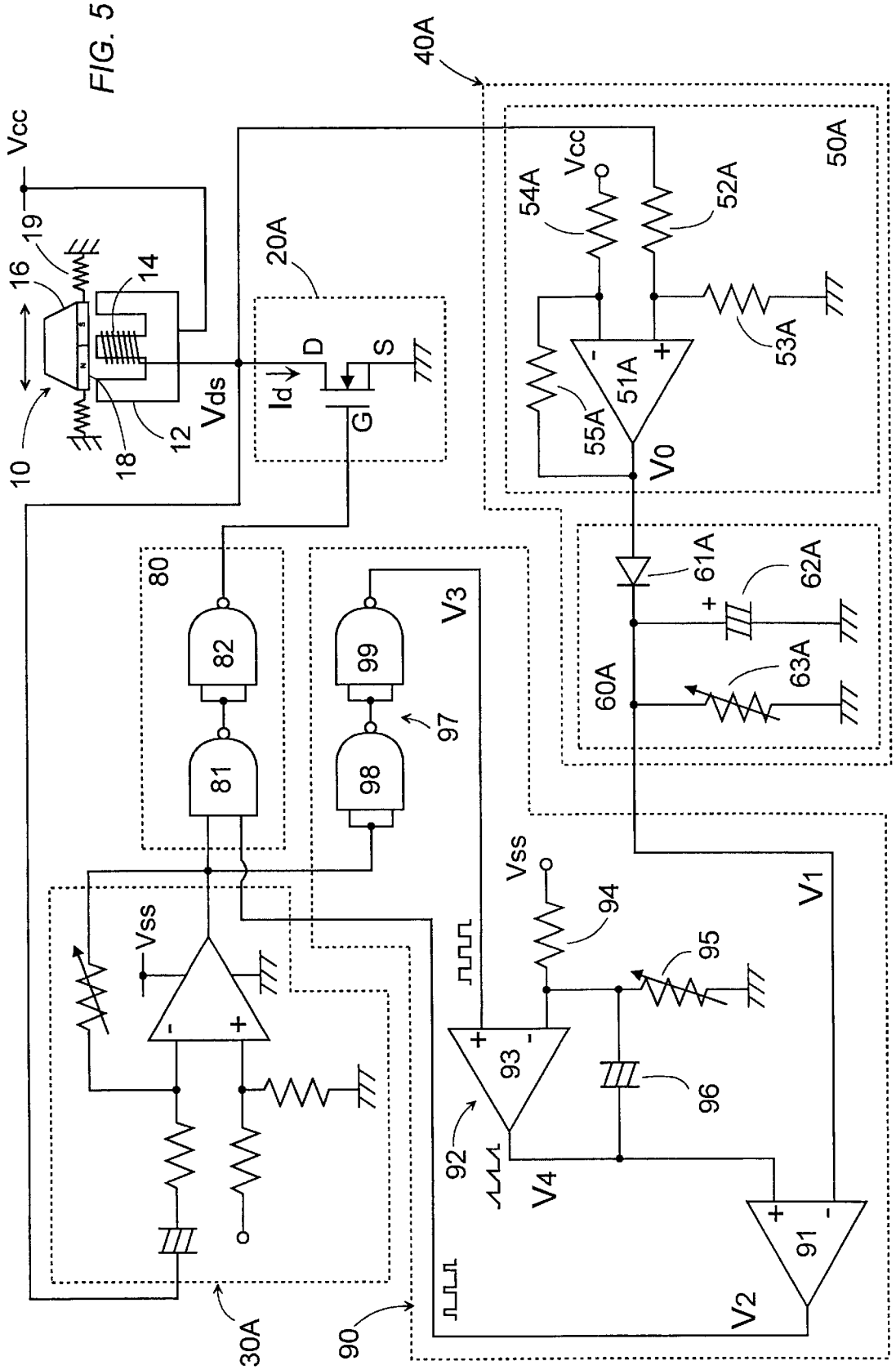
FIG. 5 is a circuit diagram of a self-oscillation system for driving a linear oscillatory actuator in accordance with a second preferred embodiment of the present invention.

FIG. 5 illustrates a like self-oscillation system for driving the linear oscillatory actuator in accordance with a second embodiment of the present invention. The system is identical to the first embodiment except for the use of a rectangular drive pulse Vgs applied to a like semiconductor switch 20A and for associated circuit arrangements for the pulse width modulation of the drive pulse Vgs based upon the detected oscillation amplitude of the reciprocator. Like parts are designated by like reference numerals with a suffix letter of "A".

In the present embodiment, the self-oscillation circuit includes an AND circuit 80 in addition to a like voltage amplifier 30A and the switch 20A. The AND circuit 80 provides the rectangular drive pulse Vgs based upon the output of the voltage amplifier 30A and the control output $V_2$ from a controller 90. The voltage amplifier 30A provides a reference signal primarily for continuing the resonant oscillation of the reciprocator 16 based upon Vbemf of the winding 14. The reference signal is modulated at the AND circuit 80 in accordance with the control signal $V_2$ from the controller 90 for generating the rectangular drive pulse Vgs. The AND circuit 80 is composed of a first NAND gate 81 and a second NAND gate, and is connected in circuit to receive the reference signal and the control signal $V_2$ at the two inputs of the first NAND gate 81. The output of the first NAND gate 81 is connected to the two inputs of the second NAND gate 82, and the second NAND gate 82 delivers the rectangular drive pulse Vgs to the gate of the switch 20A.

Figure 6:
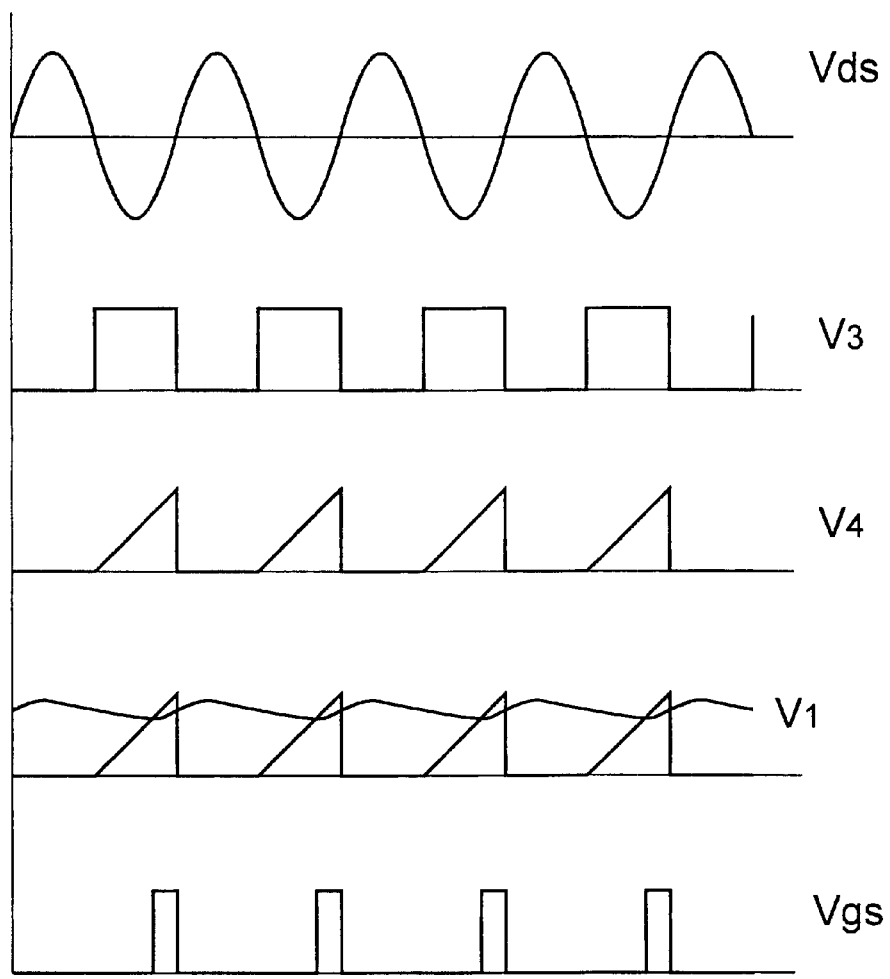
FIG. 6 is a waveform chart illustrating an operation of the above system.

The controller 90 comprises a comparator 91 connected to receive the detector output $V_1$ from a like detector circuit 40A at an inverting input and to receive a sawtooth signal $V_4$ which is obtained by processing the reference signal through a sawtooth generator 92. The detector output $V_1$ indicates the instant oscillation amplitude X of the reciprocator 16 and increases as the oscillation amplitude X increases, while the sawtooth signal $V_4$ represents the frequency of the drive pulse Vgs. The detector circuit 40A are of the same configuration as the first embodiment and is composed of a differential amplifying circuit 50A providing the output $V_0$ indicative of Vds, i.e., Vbemf, and a peak voltage detector 60A providing the detector output $V_1$ which is the peak voltage of $V_0$. The sawtooth generator 92 comprises an operational amplifier 93 having a non-inverting input connected to receive a rectangular wave signal $V_3$ from a rectangular wave generator 97. The rectangular wave generator 97, composed of a pair of NAND gates 98 and 99, reshapes the reference signal from the voltage amplifier 30A into the rectangular wave signal $V_3$ synchronized with the frequency of the drive pulse Vgs and therefore that of the reciprocator. The operational amplifier 93 has its inverting input connected to a constant voltage source Vss and the ground respectively through a resistor 94 and a variable resistor 95. A capacitor 96 is connected across the inverting input and the output of the operational amplifier 93 so that the amplifier 93 integrates the rectangular wave signal $V_3$ to present the sawtooth signal $V_4$, as shown in FIG. 6, for comparison with the detector output $V_1$ at the comparator 91. FIG. 6 is presented for easy understanding of the operation of the system shown with a simplified sinusoidal waveform of Vds. However, the other signals represents correct waveforms resulting from the actual Vds which is more complex than the sinusoidal waveform.

The comparator 91 gives the rectangular control signal $V_2$ which is high when $V_1 < V_4$. Thus, as the detector output $V_1$ decreases in response to the lowered Vbemf, i.e., the increasing load applied to the reciprocator 16, the comparator 91 gives the rectangular control signal $V_2$ with increased pulse width, and vice versa. It is this control signal signal $V_2$ that is responsible for the PWM control of varying the pulse width of the drive pulse Vgs at the AND circuit 80 in order to compensate for the load variation, thereby enabling to continue the resonant oscillation of the reciprocator 16 without considerably fluctuating the oscillation amplitude thereof. In this sense, the AND circuit 80 acts as a pulse-width modulator of modulating the reference signal from the voltage amplifier 30A into the drive pulse Vgs of varying pulse width applied to the switch 20A.

What is claimed is:

1. A self-oscillation system for driving a linear oscillatory actuator around its resonant frequency, said linear oscillatory actuator comprising:

a stator carrying one of a winding and a permanent magnet; and a reciprocator carrying the other of said winding and said permanent magnet, said winding being connected to receive a periodical electric current from a power, source to generate a magnetic flux which interacts with said permanent magnet to cause a mechanical resonance of said reciprocator, thereby forcing said reciprocator to move linearly relative to said stator;

said system comprising:

a self-oscillation circuit receiving a back electromotive force (Vbemf) developed across said winding in a positive feedback manner to generate a drive pulse by which said electric current is periodically supplied to said winding for continuing said mechanical resonance of said reciprocator;

a detector circuit which is connected to monitor said back electromotive force (Vbemf), said detector circuit receiving an input voltage (Vcc) and calculating an instant oscillation amplitude of said reciprocator from said Vbemf and said input voltage (Vcc), said detector circuit providing a detector output indicative of said instant oscillation amplitude; and a controller which issues a control signal indicative of said detector output to said self-oscillation circuit so that said self-oscillating circuit modulates said drive pulse in accordance with said control signal to regulate an electric power being supplied to said winding, thereby compensating for a variation in a load being applied to said reciprocator to continue the oscillation of said reciprocator, wherein said detector circuit is connected to monitor Vbemf of said winding in the absence of said electric current and judges said instant oscillation amplitude of said reciprocator based upon said Vbemf.

2. A self-oscillation system for driving a linear oscillatory actuator around its resonant frequency, said linear oscillatory actuator comprising:

a stator carrying one of a winding and a permanent magnet; and a reciprocator carrying the other of said winding and said permanent magnet, said winding being connected to receive a periodical electric current from a power source to generate a magnetic flux which interacts with said permanent magnet to cause a mechanical resonance of said reciprocator, thereby forcing said reciprocator to move linearly relative to said stator;

said system comprising:

a self-oscillation circuit receiving a back electromotive force (Vbemf) developed across said winding in a positive feedback manner to generate a drive pulse by which said electric current is periodically supplied to said winding for continuing said mechanical resonance of said reciprocator;

a detector circuit which is connected to monitor said back electromotive force (Vbemf), said detector circuit receiving an input voltage (Vcc) and calculating an instant oscillation amplitude of said reciprocator from said Vbemf and said input voltage (Vcc), said detector circuit providing a detector output indicative of said instant oscillation amplitude; and a controller which issues a control signal indicative of said detector output to said self-oscillation circuit so that said self-oscillating circuit modulates said drive pulse in accordance with said control signal to regulate an electric power being supplied to said winding, thereby compensating for a variation in a load being applied to said reciprocator to continue the oscillation of said reciprocator, wherein said detector circuit is connected to monitor Vbemf of said winding in the absence of said electric current and judges said instant oscillation amplitude of said reciprocator based upon said Vbemf, wherein said self-oscillation circuit comprises a voltage amplifier providing said drive pulse of a variable pulse width, and a switch connected in series with said winding across said power source to flow said electric current from said power source through said winding, said voltage amplifier receiving said Vbemf through a positive feedback path from said linear actuator to provide said drive pulse which is applied to said switch for periodically supplying said electric current through said winding for continued resonant oscillation of said reciprocator, said switch allowing said electric current to be self-regulated to vary in a reverse proportion to said Vbemf, thereby forming a self-current compensator which compensates for a current reduction resulting from the increasing load, said voltage amplifier also receiving said control signal from said controller to act as a pulse width modulator which varies the pulse width of said drive pulse thereby in a direction of increasing said pulse width with the decreasing Vbemf detected at said detector circuit, said switch responding to said drive pulse to flow said electric current over a period of said drive pulse width in compensation for a variation in said Vbemf indicative of the load applied to the reciprocator for continued resonant oscillation of said reciprocator.

3. The system as set forth in claim 2, wherein said voltage amplifier comprises an operational amplifier which outputs said drive pulse, said operational amplifier having an inverting input receiving said Vbemf and a non-inverting input receiving said control signal from said controller, said control signal varying a bias of said operational amplifier so as to vary the pulse width of said drive pulse.

4. The system as set forth in claim 2, wherein said power source is a DC power source which supplies the DC electric current to said winding through said switch, said detector circuit judging said oscillation amplitude based upon the peak voltage of said Vbemf.

5. A self-oscillation system for driving a linear oscillatory actuator around its resonant frequency, said linear oscillatory actuator comprising:

a stator carrying one of a winding and a permanent magnet; and a reciprocator carrying the other of said winding and said permanent magnet, said winding being connected to receive a periodical electric current from a power source to generate a magnetic flux which interacts with said permanent magnet to cause a mechanical resonance of said reciprocator, thereby forcing said reciprocator to move linearly relative to said stator;

said system comprising:

a self-oscillation circuit receiving a back electromotive force (Vbemf) developed across said winding in a positive feedback manner to generate a drive pulse by which said electric current is periodically supplied to said winding for continuing said mechanical resonance of said reciprocator;

a detector circuit which is connected to monitor said back electromotive force (Vbemf), said detector circuit receiving an input voltage (Vcc) and calculating an instant oscillation amplitude of said reciprocator from said Vbemf and said input voltage (Vcc), said detector circuit providing a detector output indicative of said instant oscillation amplitude; and a controller which issues a control signal indicative of said detector output to said self-oscillation circuit so that said self-oscillating circuit modulates said drive pulse in accordance with said control signal to regulate an electric power being supplied to said winding, thereby compensating for a variation in a load being applied to said reciprocator to continue the oscillation of said reciprocator, wherein said detector circuit is connected to monitor Vbemf of said winding in the absence of said electric current and judges said instant oscillation amplitude of said reciprocator based upon said Vbemf, wherein said self-oscillation circuit comprises a voltage amplifier providing a reference signal of a frequency synchronized with the oscillation of said reciprocator, an AND circuit having one input receiving said reference signal and the other input receiving said control signal from said controller, and a switch connected in series with said winding across said power source to flow said electric current from said power source through said winding, said controller comprising a sawtooth generator which issues a sawtooth signal having a frequency synchronized with the oscillation of said reciprocator, and a comparator which compares said sawtooth signal with the detector output indicative of the oscillation amplitude of said reciprocator in order to provide said control signal in the form of a rectangular pulse of which width varies in reverse proportion to said Vbemf and in direction proportion to the load being applied to said reciprocator, said AND circuit acting as a pulse width modulator to modulate said reference signal by said control signal to provide said drive pulse of which pulse width varies in direct proportion to said load, said switch responding to said drive pulse to flow said electric current over a period of said drive pulse width in compensation for a variation in said Vbemf indicative of the load applied to the reciprocator for continued resonance of said reciprocator, said switch allowing said electric current to be self-regulated to vary in a reverse proportion to said Vbemf, thereby defining a self-current compensator which compensates for a current reduction resulting from the increased load.

6. The system as set forth in claim 5, wherein said sawtooth generator includes a rectangular wave generator which receives said reference signal from said voltage amplifier and reshapes it into a rectangular wave signal, and an integrator which integrates said rectangular wave signal to provide said sawtooth signal of which frequency is synchronized with said reciprocator.

7. The system as set forth in claim 5, wherein said detector circuit comprises a differential amplifier providing an output voltage indicative of a difference between said Vbemf and a reference voltage, and a peak voltage detector which determines a peak voltage of said output voltage as said detector output which is indicative of the oscillation amplitude of said reciprocator and is compared with said sawtooth signal at said comparator to provide said control signal.

* * * * *